United States Patent
Gouch

(10) Patent No.: US 7,258,456 B2
(45) Date of Patent: Aug. 21, 2007

(54) LIGHT FILTERING APPARATUS

(75) Inventor: Martin Gouch, Hertfordshire (GB)

(73) Assignee: FFEI Limited, Hertfordshire (GB)

( * ) Notice: Subject to any disclaimer, the term of this patent is extended or adjusted under 35 U.S.C. 154(b) by 0 days.

(21) Appl. No.: 10/991,171

(22) Filed: Nov. 16, 2004

(65) Prior Publication Data

US 2006/0103952 A1 May 18, 2006

(51) Int. Cl.
*G02B 5/04* (2006.01)
*G02B 27/14* (2006.01)
*G01J 3/28* (2006.01)

(52) U.S. Cl. .................. 359/615; 359/634; 356/330
(58) Field of Classification Search ............... 359/615, 359/558, 559, 563, 566, 568, 634; 356/310, 356/330, 326, 328

See application file for complete search history.

(56) References Cited

U.S. PATENT DOCUMENTS

| | | | |
|---|---|---|---|
| 6,392,748 B1* | 5/2002 | Fateley | 356/330 |
| 6,735,362 B1* | 5/2004 | Soskind | 385/37 |
| 6,859,275 B2* | 2/2005 | Fateley et al. | 356/330 |
| 2005/0046839 A1* | 3/2005 | Harnisch | 356/328 |

* cited by examiner

*Primary Examiner*—Ricky Mack
*Assistant Examiner*—M. Hasan
(74) *Attorney, Agent, or Firm*—Sughrue Mion, PLLC

(57) ABSTRACT

A light filtering apparatus includes a first dispersion device, a spatial filter and a second dispersion device. The first dispersion device is arranged to cause spatial dispersion of an incident light beam as a function of its frequency. The spatial filter is arranged to filter the dispersed light beam so as to produce a spatially filtered resultant beam. The second dispersion device is arranged to recombine the dispersed and filtered light beam so as to produce an output light beam having a substantially similar spectrum at any position within the output beam cross-section.

37 Claims, 6 Drawing Sheets

Figure 7
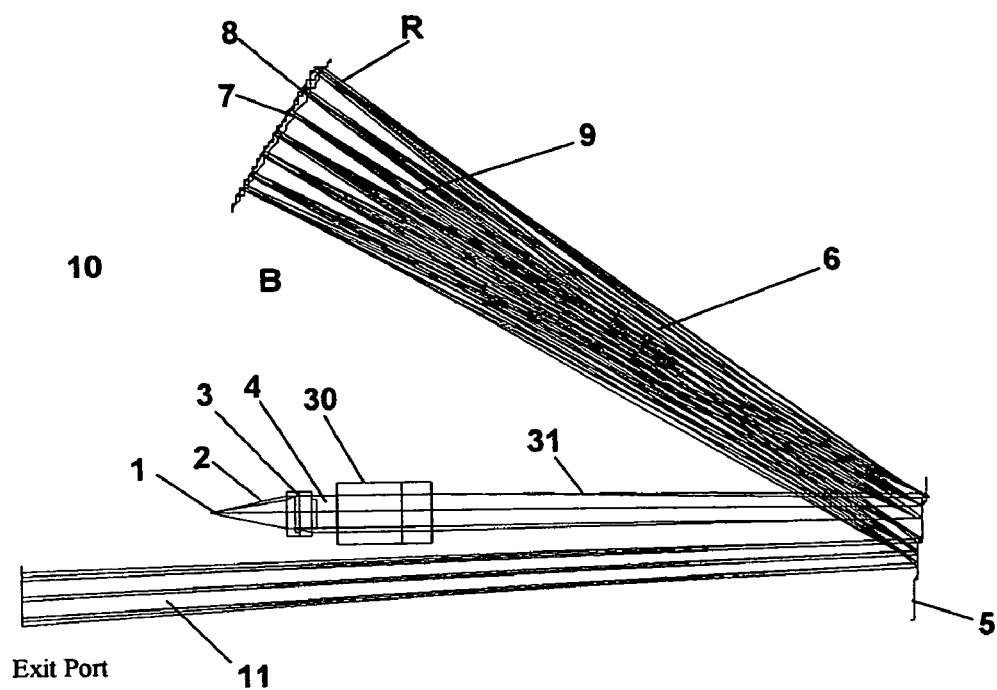
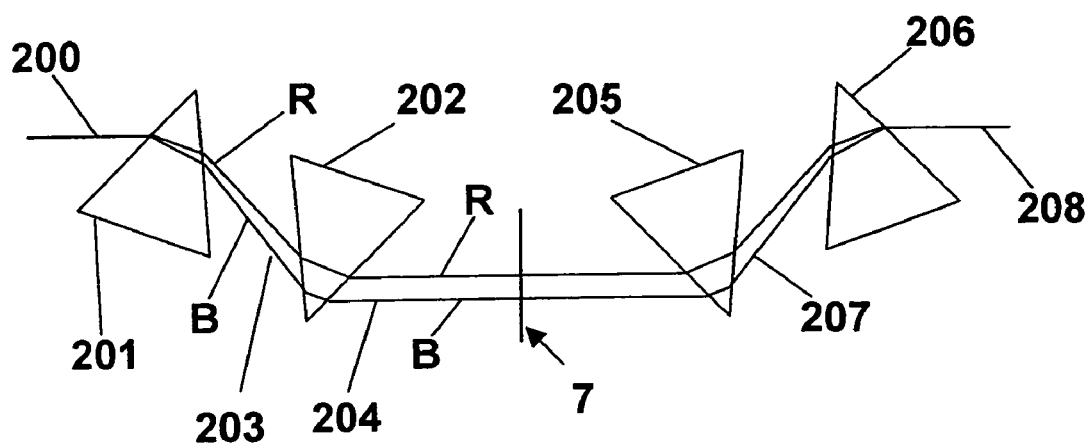
Figure 8

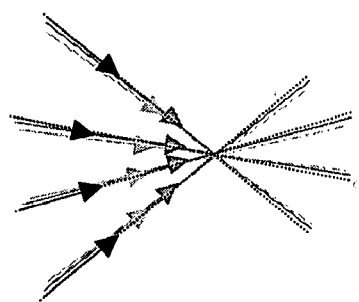
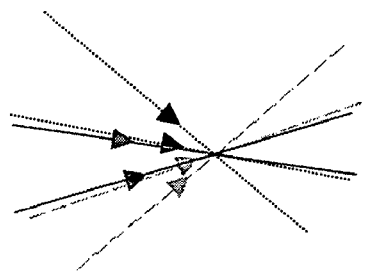
→ Red
→ Green
→ Blue
Prior Art
Figure 11           Figure 12
Figure 13
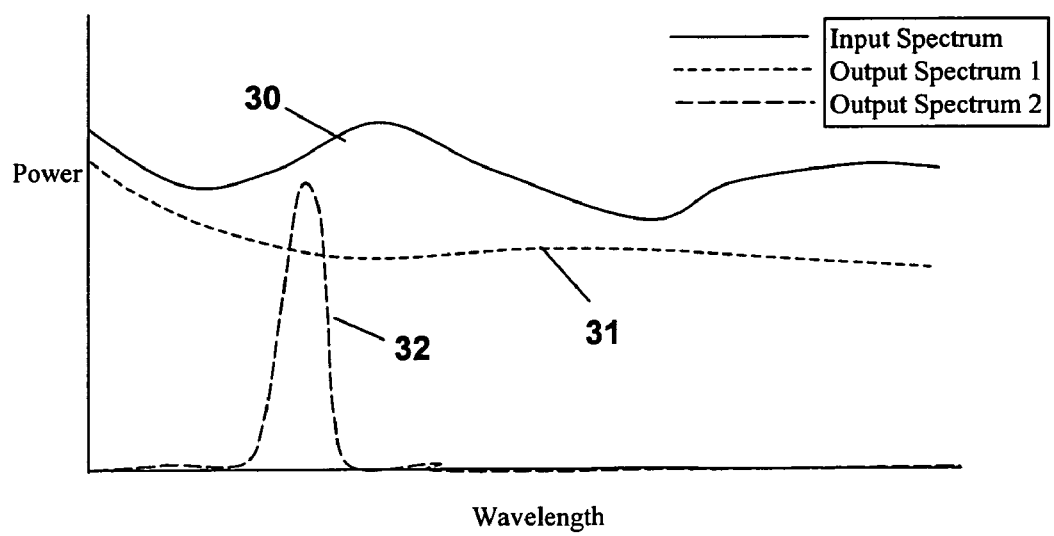

LIGHT FILTERING APPARATUS

FIELD OF THE INVENTION

The present invention relates to light filtering apparatus.

It is often desirable to filter light so that a specific spectral illumination or coloured light is produced. In static situations this is normally performed using coloured filter glass or dichroic filters. When the colour is desired to be changed either the filters need to be changed or some other technology needs to be used. A common solution for this is the colour filter wheel in which a number of filters are placed around a wheel and rotated so a single filter is in the optical path. This can increase the number of filters available in a system and if the wheel is kept rotating the wheel will switch sequentially between each colour. However, it is not possible to select any desired spectral curve or any colour. Only a similar number of colours as there are filter on the wheel can be selected, apart from the crossover parts where the optical beam is spread over two adjacent filters.

Another known filtering technology is a monochromator where the optical beam is separated spectrally with a grating or a prism and filtered with a slit. In this case the slit width will control the spectral range of the light and the slit position in the spectrum will control the hue of the light. Typically the position of the slit is not moved but the grating, or other component in the optical system, is moved or rotated such that the point and angle of exit of the optical beam remains constant. In this way the light exiting the instrument only changes in colour or spectrum. A typical arrangement for a monochromator is shown in FIG. 1.

Referring to FIG. 1, light is provided from a source via an entrance slit 100 and is reflected off a curved mirror 101 onto a rotatable reflective diffraction grating 102. The mirror 101 converts the divergent light beam 104 emitted from the entrance slit 100 into a substantially parallel beam 105 which is then incident upon the rotatable diffraction grating 102. The grating 102 disperses the parallel beam 105 in a manner according to the frequency components of the light and the dispersed beam 106 is then reflected off a curved focussing mirror 107 onto an exit slit 108 which only allows passage of part of the spectrum through the slit. As shown in the FIG. 1 example, the green part of the spectrum (G) is allowed to pass through the slit whereas the blue (B) and red (R) parts are blocked. This therefore allows the selection of parts of the white light spectrum of the beam 104 to be used in downstream optical procedures.

One problem with the FIG. 1 apparatus is that it allows only passage of one continuous part of the frequency spectrum. If it is desired to use two or more different parts of the spectrum, then either a multiple slit exit 108 needs to be devised or multiple instances of the FIG. 1 apparatus used. However, this causes a problem in that it is difficult to combine the distinct output beams so as to produce a combined uniform beam having homogeneity across the beam cross-section.

A further problem is that, it is difficult to modify such a system so as to provide versatility in the selection of parts of the spectrum since this involves the production of specific exit slits 108 for each particular desired spectral output.

SUMMARY OF THE INVENTION

In accordance with the invention, we provide light filtering apparatus comprising:

a first dispersion device arranged to cause spatial dispersion of an incident light beam as a function of its frequency;

a spatial filter arranged to filter the dispersed light beam so as to produce a spatially filtered resultant beam; and a second dispersion device arranged to recombine the dispersed and filtered light beam so as to produce an output light beam having a substantially similar spectrum at any position within the output beam cross-section.

We have realised that the problems of the prior art can be addressed by using first and second dispersion devices which are respectively upstream and downstream of a spatial filter. The first dispersion device causes the spatial dispersion of the beam and this is then reversed by the second dispersion device which operates in the opposite sense and thereby reverses the dispersion. Between these two devices, a spatial filter is located so as to allow a selection of particular parts of the spectrum desired prior to recombining the beam.

This is advantageous in that it allows a very high degree of control over the spectral content of the output beam by selection of an appropriate spatial filter. This conveniently also produces an output beam having the extremely desirable property that the spectrum is substantially similar at any position within the output beam cross-section. This therefore prevents undesired chromatic effects which are a common problem in known light filtering apparatus. Aside from the filtering, the intensity distribution of the beam cross-section may be similar in the initial and output beams.

The first and second dispersion devices, can be arranged in a number of ways, although in each case the second dispersion device operates in the opposite sense to the first dispersion device with respect to the beam direction. One or each of the first and second dispersion devices may therefore comprise a prism or a diffraction grating. Typically such dispersion is angular dispersion such that the dispersed beam is divergent downstream of the first dispersion device.

Dispersion devices which do not provide angular dispersion are also contemplated within the scope of the invention. A simple example would be a parallel-sided piece of glass, tilted with respect to the incident beam. However, the degree of dispersion in such a device tends to be less than that provided by one which functions by angular dispersion.

Depending upon the arrangement of the system, one or each of the first and second dispersion devices may be either transmissive or reflective devices. They may also function either by refractive (such as a prism) or diffractive (such as a grating) mechanisms.

The spatial filter may also take a number of forms and therefore may be also either a transmissive or reflective device. Typically this will provide a different filtering effect according to the position of incidence of the dispersed beam upon the filter. Although the spatial filter may comprise replaceable filters, each having different desired spatial filtering properties, preferably the spatial filter has light filtering properties which are controllable such that a control system can be used to vary the spatial filter properties of the device in order to produce a desired spectral output. In this case, the apparatus preferably further comprises such a control system. A computer can be used for this purpose. It is particularly preferred that the spatial filter comprises a spatial light modulator (typically computer-controlled), thus allowing precise control of the filtered light as a function of the incident positions. Such a filter combined with a chromatically dispersed beam allows a very fine degree of control over the output spectrum. An LCD is one such example filter and an LCOS (liquid crystal on silicon) is another.

We have also realised that a further advantage in terms of compactness and cost, can be provided in the use of a single dispersion device that acts as the first and second dispersion devices. In this way, the light beam passes through the dispersion device in a first direction so as to produce the dispersed beam, and then later, following filtering, the beam is returned to the dispersion device in the opposite direction such that the filtered beam is recombined into an output beam.

Although the apparatus may be used with a separate light source, typically the apparatus further comprises the light source for generating the incident beam. Such a light source preferably has a broad spectrum as is provided by a tungsten halogen lamp, xenon lamp, white light LED or fluorescent lamp. It will be appreciated that the light source and first dispersion device may be integral with one another.

In the case of light sources producing divergent beams, typically the apparatus further comprises a collimator for receiving light from the source and producing a collimated incident beam.

Whilst the invention described herein is discussed in terms of "light" filtering apparatus, it will be understood that the term "light" is not limited to the visible parts of the electromagnetic spectrum and indeed includes other parts such as ultra-violet or infra-red which can be filtered in a similar manner.

Some examples of light filtering apparatus according to the present invention are now described with reference to the accompanying drawings, in which:

BRIEF DESCRIPTION OF THE DRAWINGS

FIG. 7 shows a fourth example of the invention;

FIG. 8 shows a fifth example of the invention using four prisms;

FIG. 11 shows how the beam spectral content is invariant with angle and position;

FIG. 12 illustrates variance in prior art beams; and

FIG. 13 shows the controllable nature of the output spectrum due to the use of an SLM spatial filter.

FIG. 2 shows a first example of light filtering apparatus according to the invention. Here a white light source 1 including an entrance slit is provided so as to produce a divergent beam 2. This is incident upon a collimating lens 3 which produces a collimated beam 4 which in turn is then incident upon a reflective diffraction grating 5. The diffraction grating 5, acting as a first dispersion device, diffracts the collimated beam and produces a reflected spatially dispersed beam 6 in which the component frequencies of light are angularly dispersed according to their frequency. This is shown in FIG. 2 where the longer wavelength red part of the white light spectrum is indicated at R and the shorter wavelength blue at B. A continuous white light spectrum is therefore provided by the grating 5 and this is incident upon a spatial light modulator (SLM) 7, acting as a spatial filter.

In this case the SLM 7 is integral with a curved mirror 8 which reflects and refocusses the filtered light beam 9 back upon the grating 5.

DETAILED DESCRIPTION OF THE PREFERRED EMBODIMENTS

Figure 2:
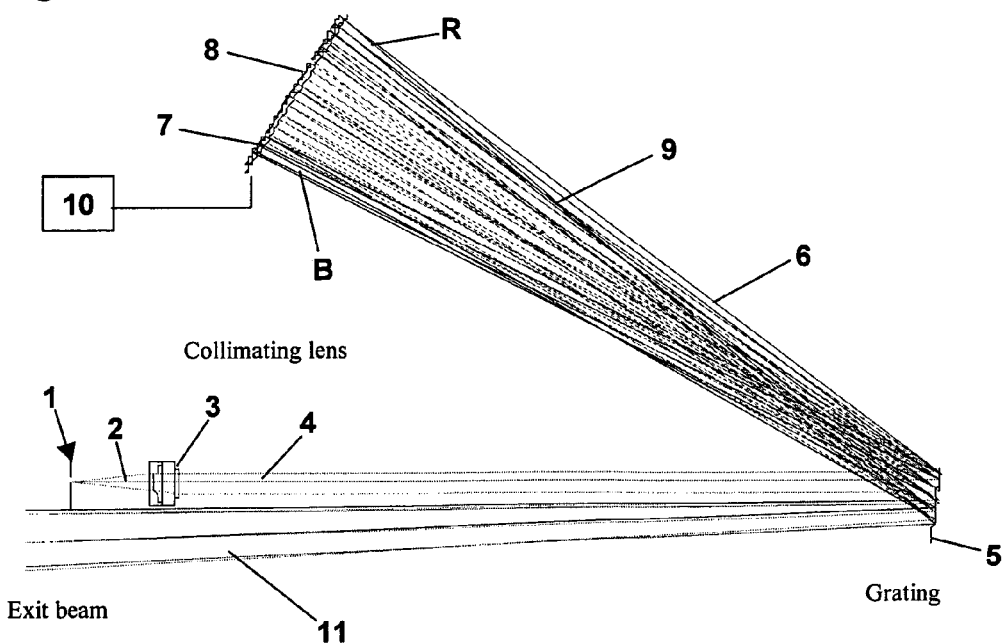
FIG. 2 shows an arrangement according to a first example of the invention.

As is shown schematically in FIG. 2, the SLM is controlled by a control system 10. This allows the user to select the parts of the SLM 7 which allow passage of the beam, and those parts which are desired to block the beam. Because the incident beam 6 is dispersed spatially according to its frequency, then very narrow frequency bands (of the size of the SLM pixels), can be selected to form part of the filtered reflected beam 9. This provides the advantage of allowing the programming of virtually any spectral shape that is desired and not just bandpass shapes. A further advantage of the use of an SLM is that effectively there are no moving parts within the system which is of course desirable in an optical system.

Following filtering by the SLM 7 and reflection by the integral mirror 8, the beam 9 is refocussed upon the diffraction grating 5. The reflective diffraction grating 5 acts as a second dispersion device with respect to the filtered beam 9 and the action of the grating recombines the angularly dispersed beam into an output beam 11. The angular dispersion is therefore reversed and as a result the output beam 11 has a spectrum which is substantially uniform at all points within the output beam cross-section. The spectrum is therefore uniform across the output beam in both spatial position and angularly such that light from any angle or at any position across the output beam will have substantially the same spectral form.

Figure 3:
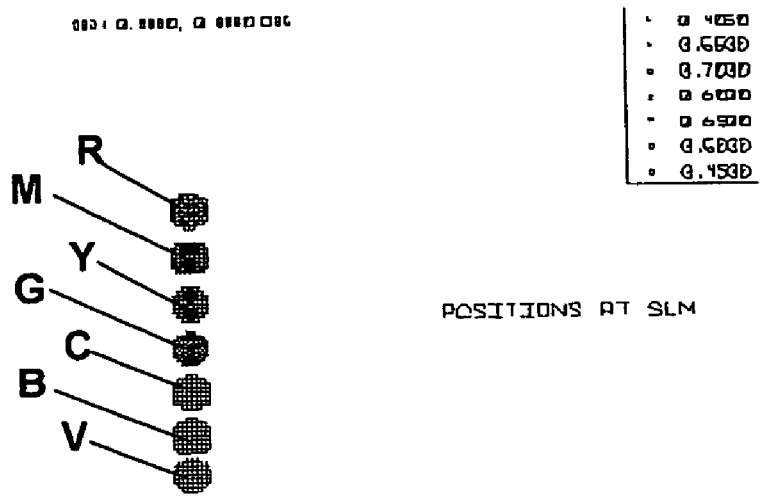
FIG. 3 shows the spectral distribution of the dispersed beam at the spatial filter of the first example.

Referring now to FIG. 3, this shows the modelled spatial distribution of the beam 6 when incident upon the SLM. As can be seen from FIG. 3, the spectrum of the incident light beam 2 is positioned as a function of its frequency, including the coloured spectrum of red (R), magenta (M), yellow (Y), green (G), cyan (C), blue (B), and violet (V). It should be noted here that in reality the beam is continuous as a function of frequency and not as discrete colours as is shown in FIG. 3.

Figure 4:
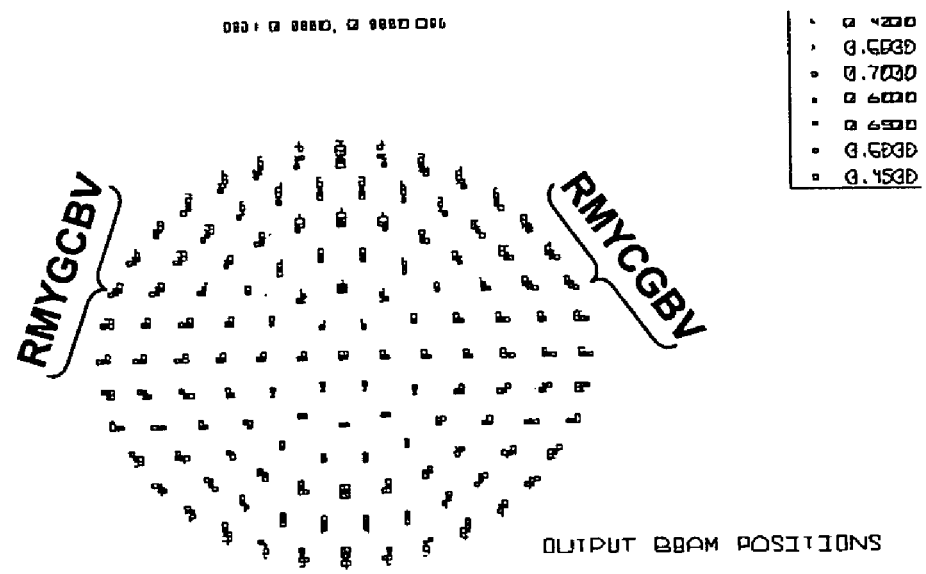
FIG. 4 shows the spectral uniformity of the output beam cross-section.

A modelled frequency distribution within the output beam 11 is shown in FIG. 4. Here it can be seen that, importantly, each of the clusters of points contains each of the colours shown in FIG. 3. Again as in FIG. 3, it will be appreciated in reality that the beam is continuous throughout its cross-section, with discrete calculations being required for modelling purposes.

Whilst a diffraction grating 5 was used in the first example given above, for both the first and second dispersion devices, it will be understood that, alternatively, a prism could also be used for this purpose and in the example now described.

Figure 5:
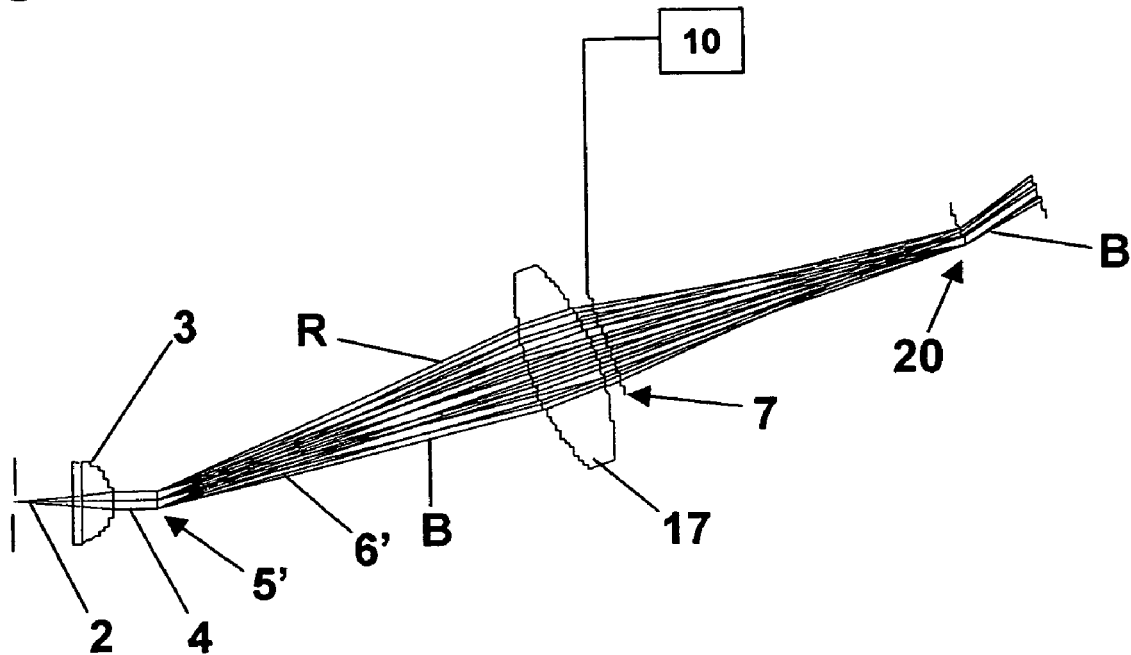
FIG. 5 shows a second example arrangement using a lens.

Referring now to FIG. 5, a second transmissive example of the invention is shown. Here, as in all the following examples, like components are indicated with similar reference numerals in the corresponding figures, with modified components being indicated with primed referenced numerals. Here the arrangement of the components 1 to 4, that is, up to the production of the collimated beam 4, is similar to the first example. In this case however a transmissive diffraction grating 5' is used in order to produce the spatially dispersed beam 6'. This is incident upon a biconvex lens 17, downstream of which an SLM 7 is located. In this transmissive system, the convergent light from the lens 17 is incident upon the SLM 7 and passes through it, this being focussed onto a second diffraction grating 20 acting as the second dispersion device. This second grating therefore recombines the angularly dispersed filtered beam from the SLM 7 and refocussing lens 17 in a similar manner to the grating 5 in the first example, so as to produce an output beam 11 which again has substantial uniformity in the spectrum across the beam and can be used downstream for other desired procedures.

Figure 6:
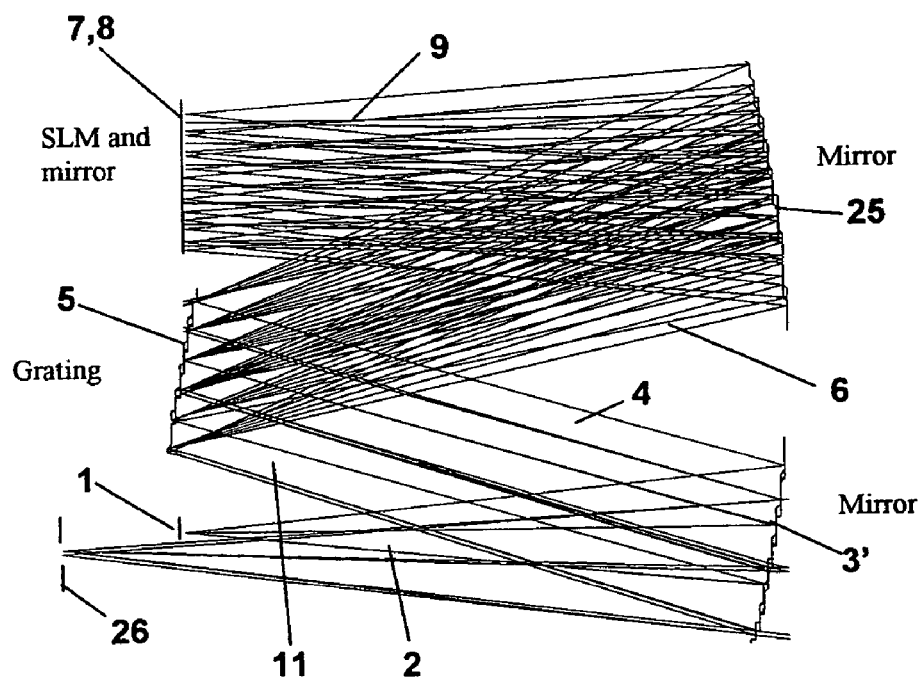
FIG. 6 shows a third example of the invention.

FIG. 6 shows a further embodiment in which the collimating lens 3 is replaced by a mirror 3' that reflects the incident beam 2 as a collimated beam 4 towards a reflective diffrative grating 5. In this case, the angularly dispersed beam 6 is reflected by a further curved mirror 25 towards an SLM 7 and integral mirror 8. The filtered and dispersed beam 9 is then reflected back along the beam path via the mirror 25 onto the grating 5 where it is recombined into an output beam 11, this then being refocussed by the mirror 3' and passed through an exit slit 26. It will therefore be appreciated that the first and third examples operate in a very similar manner using mirrors and a common first and second dispersion device.

In a fourth embodiment shown in FIG. 7, this being another modification of the first embodiment, a focussing lens 30 is positioned in the collimated beam 4 so as to produce a focussed beam 31 which is incident upon the grating 5. The focussing lens 30 narrows the angle of the dispersed beam 6 reflected from the grating 5. This is then reflected and filtered by the combination of a curved focussing mirror 8 and SLM 7 respectively and the resultant beam is passed back to the grating 5 where it is recombined into the output beam 11.

It should be noted that FIG. 2 has a collimated output from the lens 3 whilst the present embodiment of FIG. 7 has a focused output from lens 30. In FIG. 2 the beam diameter for any wavelength at the SLM 7 is the same as the beam diameter at the lens 3. For FIG. 7 the beam diameter at the SLM is the optical magnification of the entrance aperture 1 as imaged at the SLM. For an individual wavelength this is normally much smaller than the beam diameter at lens 3. Thus the amount of dispersion to produce the same wavelength separation in FIG. 7 is less than that required in FIG. 2. This gives either better wavelength separation or a smaller system for the same wavelength separation.

A fifth embodiment of the invention is shown in FIG. 8. Here, two prisms 201, 202 act upon an input beam 200. The beam 200 is incident upon the first prism 201 and is refracted into a divergent beam 203 before it impinges upon the prism 202. The beam 203 is again refracted by the prism 202 so as to produce a parallel beam 204 which is spatially but not angularly dispersed as a function of frequency. This is then incident upon a transmissive SLM 7. Downstream of the SLM further prisms 205 and 206 are positioned, the prism 205 receiving the spatially filtered beam and producing a convergent and therefore angularly dispersed beam 207. The beam 207 is then incident upon the final prism 206 where it is recombined into an output beam 208 which has a substantially similar spectrum at any position within the output beam cross-section.

Figure 9:
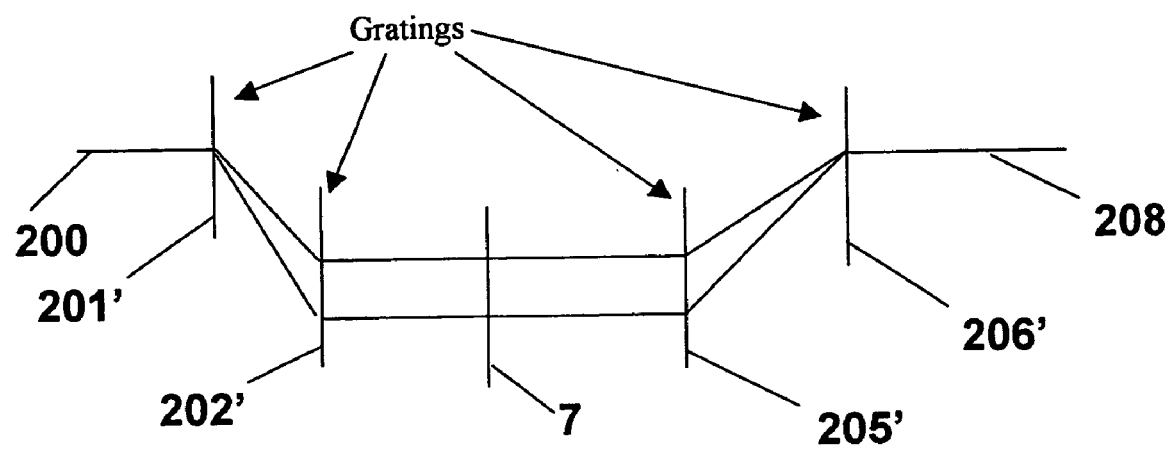
FIG. 9 shows a sixth example of the invention using four diffractive gratings.

A variation upon this embodiment is shown in FIG. 9 as a sixth embodiment. Here the incident white light beam 200 is passed through four diffraction gratings 201', 202', 205', 206', these replacing the prisms of the fifth example. As is known, diffraction gratings act upon light in a different manner to prisms and therefore the use of normal diffraction gratings maybe somewhat inefficient. However, this may be improved by the use of "blazed" gratings which concentrate the light into the first positive or negative order beam.

Figure 10:
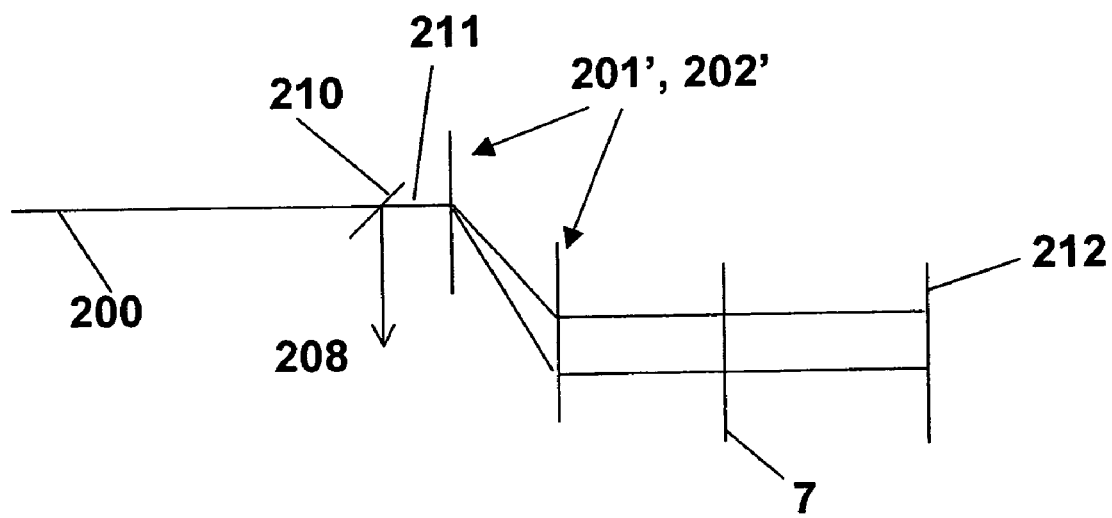
FIG. 10 shows a seventh example using two gratings and a mirror.

A seventh embodiment of the invention is shown in FIG. 10 in which an incident white light beam 200 is firstly impinged upon a beam splitter 210 so as to produce a transmitted component beam 211. This then impinges upon first and second gratings 201', 202' as in the sixth example, the resultant beam then passing through the SLM 7. Beyond the SLM, a flat mirror 212 is provided which redirects the light back along the same beam path and through the SLM 7. The gratings 202' and 201' then act upon the beam in reverse (and perform a similar function to the gratings 205' and 206' in the sixth embodiment). The resultant beam is then once again incident upon the beam splitter 210 and the partially reflected part becomes the output beam 208 having the desired spectrum.

It will be appreciated that other arrangements involving mirrors, lenses, diffraction gratings or prisms in various combinations can be envisaged which also produce the desired filtering effects of the invention.

It should be noted that each of the examples above is described using an SLM as a spatial filter. Other spatial filters include LCDs, LCOs and in principle, adjustable slits, rotating wheels and defined spatial absorption filters such as a black and white photograph. SLMs are particularly advantageous because, as the beam 6 is spatially separated at the SLM position, it is possible to modulate the spectral content by changing the opacity of the SLM. For instance, if it is desired to reduce the green content by 50%, the SLM at the point where the green light passes through can be set to a 50% transmission value. If the SLM is only capable of binary state transmission (on or off) then a chequer board pattern can be set at the green region such that every other pixel of the SLM is turned off in this region. Thus from the knowledge of a spectral input, it is possible to produce a new spectral output which has an entirely different form to that of the input. It is therefore not only possible to produce a narrow spectral output but also a different colour "temperature" of white light or any other desirable colour.

The particular advantages of using an SLM are that no moving parts are required to change the output colour, a rapid response time is provided due to the SLM response time and virtually any spectral response desired can be produced.

FIGS. 11 and 12 compare the properties of an output beam according to the apparatus of the invention (FIG. 11), with that of a prior art system (FIG. 12). In FIGS. 11 and 12, three colour components red, green and blue are illustrated. It will be noted in FIG. 11 that a focussed beam according to the invention has the entire spectral content at all positions and at all angles. By contrast, that of FIG. 12 has the spectral content limited only to certain angles and positions in the beam outside of the focal point. Thus shadows or out of focus beams will show changing spectral content in such a prior art arrangement. This therefore illustrates how the unwanted chromatic effects found in prior art apparatus are overcome by the present invention.

Figure 1:
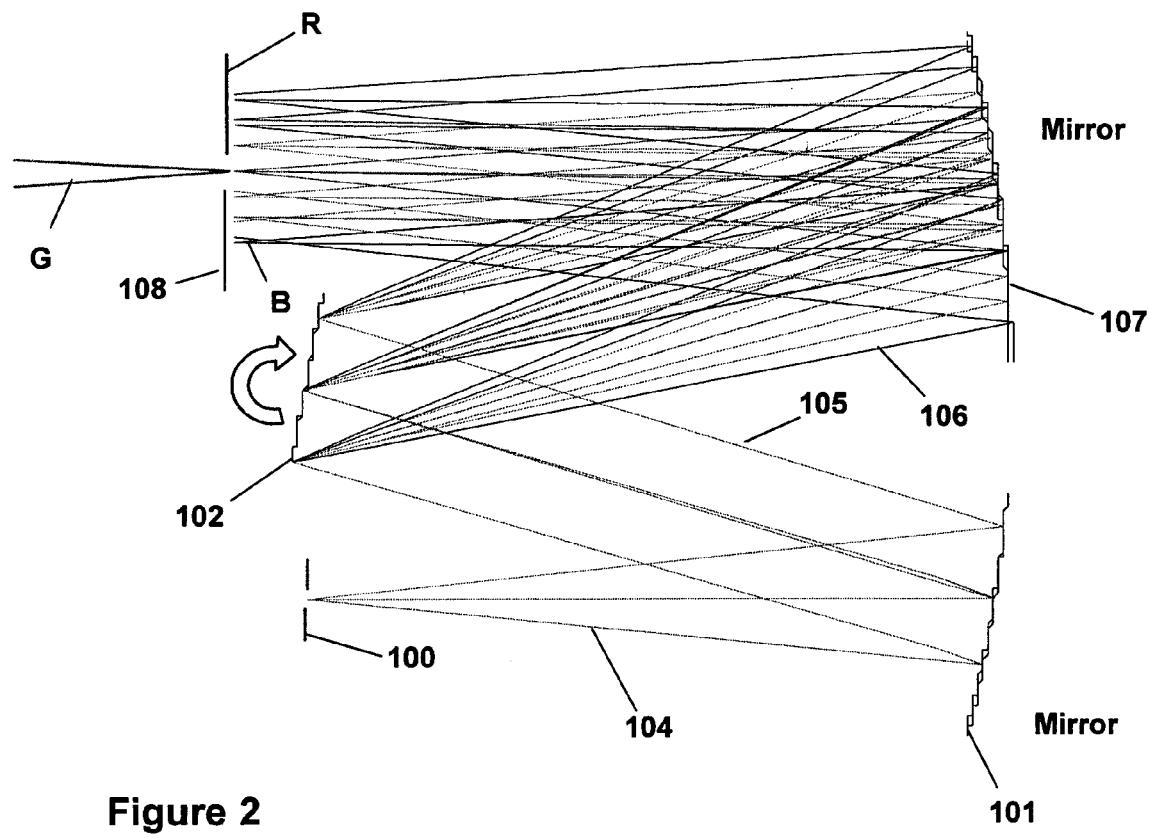
FIG. 1 illustrates a prior art colour filter arrangement.

FIG. 13 illustrates the versatility provided by the SLM. In FIG. 8, a graph of light power as a function of wavelength is provided, this being illustrative of various spectra. A typical input spectrum is shown by the solid line 30. The filtered output spectrum 31 illustrates the manner in which the SLM can be used to provide a more uniform spectrum as a function of wavelength. A narrow bandpass spectrum 32 can also be produced by the same SLM, controlled in accordance with the control system 10. This therefore has an output analogous to the prior art system shown in FIG. 1 which illustrates the versatility of the invention.

With the apparatus described here, the spectrum in the output beam is substantially uniform across the output beam enabling wide band spectra to be used.

I claim:

1. Light filtering apparatus comprising:
   a first dispersion device arranged to cause spatial dispersion of an incident light beam as a function of its frequency;
   a spatial filter arranged to filter the dispersed light beam so as to produce a spatially filtered resultant beam; and
   a second dispersion device arranged to recombine the dispersed and filtered light beam so as to produce an output light beam having a substantially similar spectrum at any position spatially and angularly within the output beam cross-section.

2. Light filtering apparatus according to claim 1, wherein the second dispersion device operates in the opposite sense to the first dispersion device with respect to the respective beam direction.

3. Light filtering apparatus according to claim 1, wherein the spatially dispersed beam is angularly dispersed by the first dispersion device.

4. Light filtering apparatus according to claim 1, wherein the spatial filter is a transmissive filter.

5. Light filtering apparatus according to claim 1, wherein the spatial filter comprises a replaceable filter.

6. Light filtering apparatus according to claim 1, wherein the light filtering properties of the spatial filter are controllable.

7. Light filtering apparatus according to claim 6, wherein the spatial filter is controllable or programmable.

8. Light filtering apparatus according to claim 7, wherein the light filtering properties are controllable as a function of the position of incidence of the dispersed beam upon the filter.

9. Light filtering apparatus according to claim 8, wherein the filter is a spatial light modulator.

10. Light filtering apparatus according to claim 1, further comprising at least one mirror arranged to focus the light upon the second dispersion device.

11. Light filtering apparatus according to claim 1, further comprising at least one lens arranged to focus the light upon the second dispersion device.

12. Light filtering apparatus according to claim 1, wherein the first dispersion device functions by a refractive mechanism.

13. Light filtering apparatus according to claim 12, wherein the first dispersion device is a prism.

14. Light filtering apparatus according to claim 12, wherein the first dispersion device comprises two prisms.

15. Light filtering apparatus according to claim 1, wherein the first dispersion device functions by a diffractive mechanism.

16. Light filtering apparatus according to claim 15, wherein the first dispersion device is a diffraction grating.

17. Light filtering apparatus according to claim 15, wherein the first dispersion device comprises two diffraction gratings.

18. Light filtering apparatus according to claim 12, wherein the first dispersion device is a reflective device.

19. Light filtering apparatus according to claim 12, wherein the first dispersion device is a transmissive device.

20. Light filtering apparatus according to claim 1, wherein the second dispersion device functions by a refractive mechanism.

21. Light filtering apparatus according to claim 20, wherein the second dispersion device is a prism.

22. Light filtering apparatus according to claim 20, wherein the second dispersion device comprises two prisms.

23. Light filtering apparatus according to claim 1, wherein the second dispersion device functions by a diffractive mechanism.

24. Light filtering apparatus according to claim 23, wherein the second dispersion device is a diffraction grating.

25. Light filtering apparatus according to claim 23, wherein the second dispersion device comprises two diffraction gratings.

26. Light filtering apparatus according to claim 20, wherein the second dispersion device is a reflective device.

27. Light filtering apparatus according to claim 20, wherein the second dispersion device is a transmissive device.

28. Light filtering apparatus according to claim 1, wherein the first and second dispersion devices are a common dispersion device.

29. Light filtering apparatus according to claim 1, wherein a mirror is provided to direct the filtered beam back along the path of the spatially dispersed beam.

30. Light filtering apparatus according to claim 1, further comprising a light source for generating the incident beam.

31. Light filtering apparatus according to claim 30, further comprising a collimator, for receiving light from the source and producing a collimated incident beam.

32. Light filtering apparatus according to claim 30, wherein the light source and first dispersion device are an integral device.

33. Light filtering apparatus according to claim 1, wherein the light beam has frequencies in at least one of the visible, ultra-violet or infra-red parts of the electromagnetic spectrum.

34. Light filtering apparatus according to claim 33, wherein the light beam is a white light beam.

35. Light filtering apparatus according to claim 6, further comprising a control system for controlling the filtering properties of the spatial filter.

36. Light filtering apparatus according to claim 1, wherein the output beam is substantially uniform spatially and angularly as a function of position within the output beam cross section.

37. Light filtering apparatus according to claim 1, wherein the spatial filter is a reflective filter.

* * * * *